United States Patent [19]
Manjikian

[11] 3,830,372
[45] Aug. 20, 1974

[54] REVERSE OSMOSIS SYSTEM ADAPTABLE FOR MANUAL OPERATION

[76] Inventor: Serop Manjikian, P.O. Box 183, Del Mar, Calif. 92014

[22] Filed: Sept. 14, 1973

[21] Appl. No.: 397,410

Related U.S. Application Data

[63] Continuation-in-part of Ser. No. 256,185, May 23, 1972.

[52] U.S. Cl. .............................. 210/321, 210/416
[51] Int. Cl. ............................................ B01d 31/00
[58] Field of Search ........... 210/321, 332, 331, 416

[56] References Cited
UNITED STATES PATENTS

| | | | |
|---|---|---|---|
| 3,019,905 | 2/1962 | Baker et al. | 210/331 X |
| 3,160,000 | 12/1964 | Musher | 210/416 X |
| 3,389,801 | 6/1968 | Sieger | 210/416 X |
| 3,421,628 | 1/1969 | Barnabe et al. | 210/321 X |
| 3,616,929 | 11/1971 | Manjikian | 210/321 |

*Primary Examiner*—Frank A. Spear, Jr.
*Attorney, Agent, or Firm*—Clement H. Allen

[57] ABSTRACT

A reverse osmosis system comprising a pressure resistant container in which a rotatable membrane element-carrying assembly is mounted. Means for rotating the membrane element-carrying assembly and means for actuating a pump for pressurizing feed liquor introduced into the pressure resistant container are operated by human effort, and these means are preferably interconnected.

3 Claims, 5 Drawing Figures

PATENTED AUG 20 1974　　　　　　　　　　3,830,372

REVERSE OSMOSIS SYSTEM ADAPTABLE FOR MANUAL OPERATION

CROSS REFERENCE

This application is a continuation-in-part of my co-pending application Ser. No. 256,185 filed May 23, 1972.

BACKGROUND OF THE INVENTION

1. The Field of the Invention

This invention relates to a reverse osmosis system adaptable for manual operation.

2. The Prior Art

Previous reverse osmosis systems have been devised to operate by raising the feed liquid to required pressure and circulating this over the surface of a semipermeable membrane, or membranes, mounted on porous supports. The feed liquid is pressurized by a suitable pump which circulates the pressurized feed over the membrane surfaces at sufficient velocity to maintain turbulence and thus to reduce or eliminate the deleterious effects of high solute concentration in the boundary layer at the membrane-brine interface. The pump under these conditions must circulate as well as pressurize and this is often uneconomical and energy consuming because in many cases substantially greater amounts of feed liquid flow are required to maintain the desired turbulence than the amount necessary to make up for the withdrawn quantities of product and concentrate.

An improved system is described in my copending patent application Ser. No. 256,185 filed May 23, 1972 which employs a pump to pressurize feed liquid but uses a membrane element-carrying assembly which is rotated within a pressure resistant vessel to provide turbulence over the membrane surfaces for the elimination or control of high solute concentration in the boundary layer. The functions of pressurization and flow control are thereby separated. The pump needs to pressurize only the volume of liquid required for osmotic separation while rotation of the membrane element assembly provides turbulence.

Adaptation of the system of my application Ser. No. 256,185 to form a reverse osmosis system of light weight and ready portability and which would need a low power input would form a very desirable unit for emergency water supply production for lifeboats, for producing potable water for troops on the move in the field, and for other small but difficult applications.

BRIEF SUMMARY OF THE INVENTION

Summarized briefly this invention contemplates a reverse osmosis system comprising a pressure resistant vessel containing a rotatable membrane element-carrying assembly, a pump for introducing feed liquid under pressure into the pressure resistant container, and means for rotating the membrane element-carrying assembly interconnected with means for actuating the pump. The membrane element-carrying assembly rotating means and the pump actuating means are actuatable by human effort. In a modified embodiment the membrane element-carrying assembly is rotated and the pump actuated by means each of which comprises a shaft with a lever in the form of a handle or pedal. In a preferred embodiment the membrane element-carrying assembly rotating means and the pump actuating means are interconnected.

BRIEF DESCRIPTION OF THE DRAWINGS

Referring now to the drawings.

DESCRIPTION OF PREFERRED EMBODIMENTS

Figure 1:
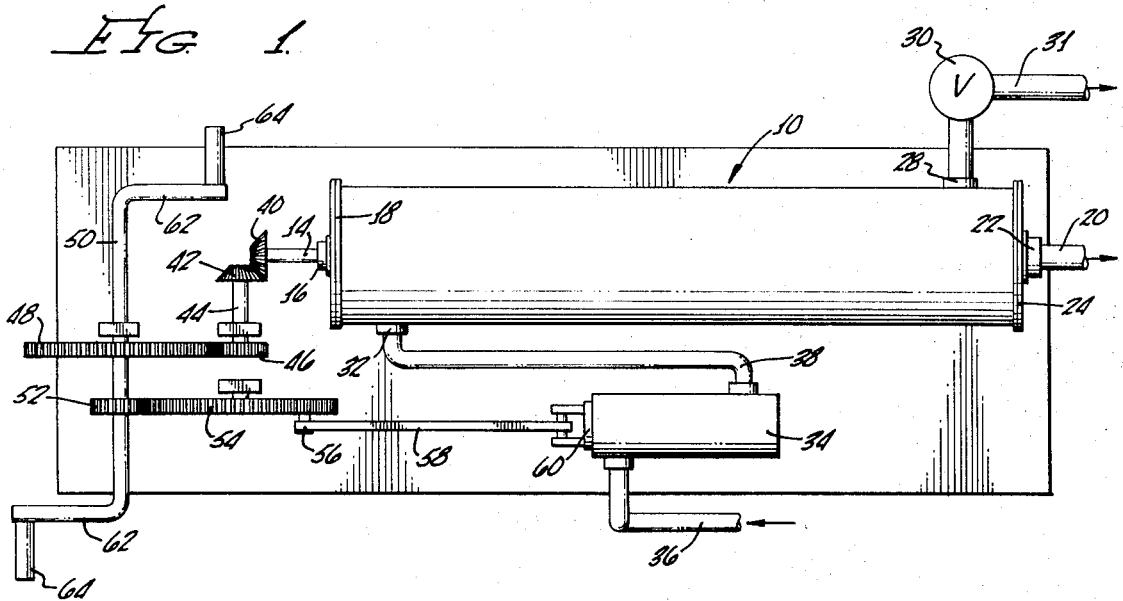
FIG. 1 shows a top view of a reverse osmosis system embodying features of this invention.

Referring now to FIGS. 1 to 4 the reverse osmosis system comprises a pressure resistant vessel 10 containing a rotatable membrane element-carrying assembly 12 as more particularly described and claimed in my co-pending patent application Ser. No. 256,185 filed May 23, 1972 of which this application is a continuation-in-part. An extending shaft 14 is connected to membrane element-carrying assembly 12 and is suitably sealed at 16 where it passes through the end 18 of pressure resistant vessel 10. At its other end membrane element-carrying assembly 12 is connected to extending hollow shaft 20 also sealed as at 22 where it passes through the other end 24 of pressure resistant vessel 10. Hollow shaft 20 connects inside pressure resistant vessel 10 with the interiors of membrane elements 26, described in detail in U.S. Pat. No. 3,578,175, so that it may act as means for collection of purified liquid passing through the membranes covering the outer surfaces of membrane elements 26.

Near one end of pressure resistant vessel 10 is a connection 28 for release of concentrated liquid through back pressure control valve 30, and outlet 31. Near the other end of pressure resistant vessel 10 is a connection 32 for introduction thereinto of feed liquid under pressure.

Pump 34, shown as a reciprocating piston type pump, is connected to a feed liquid supply line 36 and pressurizes the feed liquid for introduction into pressure resistant vessel 10 through line 38.

Means for rotating the membrane element-carrying assembly 12 and the means for actuating pump 34 are mechanically interconnected in the embodiment illustrated in FIGS. 1 to 4, such means comprise bevel gear 40 fixedly mounted on membrane element assembly shaft 14 which meshes with bevel gear 42 on one end of jack shaft 44. On the other end of jack shaft 44 is fixedly mounted pinion 46 which meshes with bull gear 48 which is fixedly mounted on cross shaft 50. Also fixedly mounted on cross shaft 50 is pinion 52 which meshes with bull gear 54 which is suitably mounted so as to be freely rotatable. In the face of bull gear 54 is rotatably mounted in off-center or eccentric position the angled end 56 of connecting rod 58 whose other end is conventionally connected to an extension 60 of the end of the piston of pump 34. Attached to the ends of cross shaft 50 are levers or cranks 62 and crank handles 64 by which shaft 50 may be rotated by human effort. Rotation of cross shaft 50 causes a higher speed rotation of shaft 14 and the membrane element-carrying assembly 12 inside pressure resistant vessel 10. Due to interconnection, rotation of cross shaft 50 also causes slower speed reciprocation of the piston and actuation of pump 34.

Figure 4:
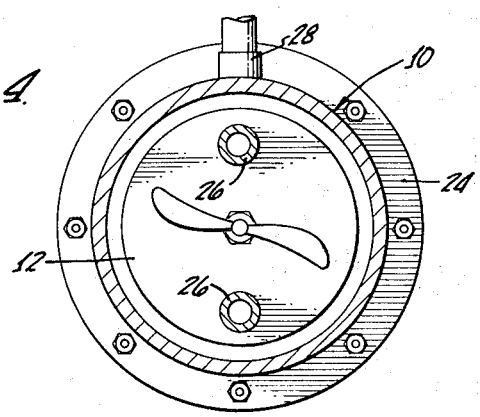
FIG. 4 shows a cross section of the pressure resistant vessel of FIG. 3 taken along the line 4—4.
Figure 5:
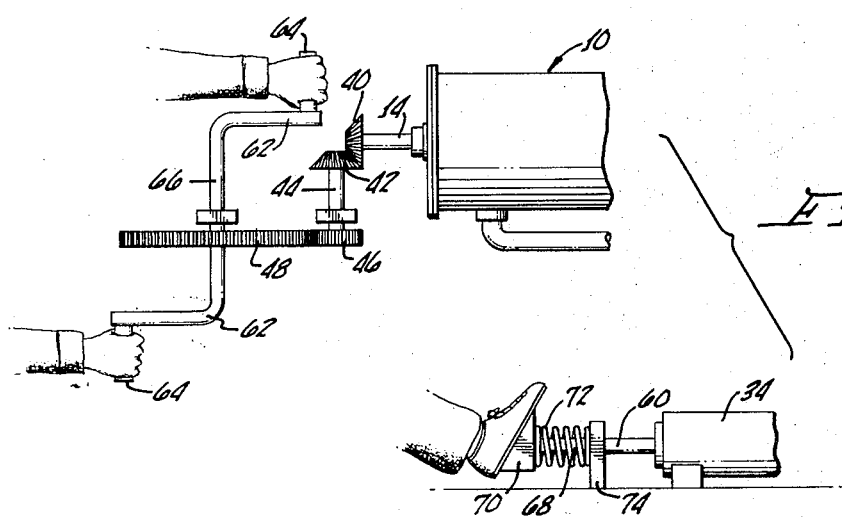
FIG. 5 illustrates in fragmentary views a modification of the system of FIG. 1 in which the membrane element-carrying assembly and the pump are rotated and actuated independently by handle and pedal.

In FIG. 5 is illustrated an embodiment of this invention in which the means for rotating the membrane element-carrying assembly 12 and the means for actuating the pump 34 are adapted for actuation by human effort but are not interconnected. As seen in FIG. 4 shaft 14 has bevel gear 40 meshing with bevel gear 42 on jack shaft 44 having end pinion 46 meshing with bull gear 48 as before. However, cross shaft 66 is somewhat shorter having levers or cranks 62 and handles 64 on each end for rotation by human effort, that is manual effort. Pump 34 is arranged also to be actuated by human effort but, in order to illustrate another modification, is arranged with a direct fixed bar 68 attached to piston extension 60 the end of bar 68 having attached thereto pedal 70. Return spring 72 surrounds bar 60 and bears at one end against pedal 70 and at the other end against fixed mount 74 so that repetitive pressure on and release of pedal 70 by foot action will cause corresponding reciprocal movement of the piston and actuation of pump 34 by human effort, that is in this case pedal effort.

Figure 2:
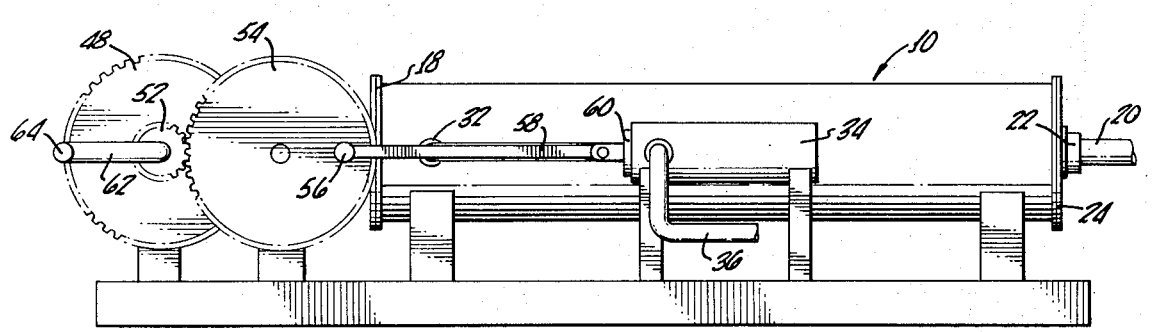
FIG. 2 shows a side view of the reverse osmosis system of FIG. 1.
Figure 3:
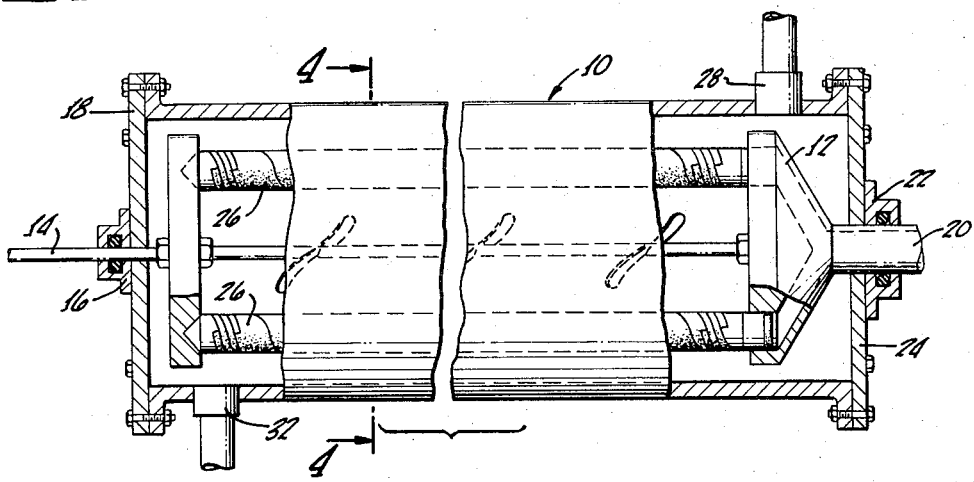
FIG. 3 shows an enlarged side view of the pressure resistant vessel of FIG. 1, partly broken out.

In operation of the reverse osmosis system of this invention, the feed liquid supply line is connected to a source of water to be purified which may be brackish water or sea water, it will be understood that the membrane element-carrying assembly 12 inside pressure resistant vessel 10 will be equipped with elements covered with semipermeable membranes of a type suitable for purification of the feed liquid. Then handles 64 as seen in FIGS. 1 and 2 are rotated thereby rotating the membrane element-carrying assembly 12 and due to the interconnection also causing reciprocation of the piston in pump 34 to pressurize the feed liquid and introduce it under pressure into pressure resistant container 10. Purified liquid is separated from the feed liquid by the semipermeable membranes and is collected inside membrane elements 26 and is transferred out of pressure resistant container 10 through hollow shaft 20. Brine is released from pressure resistant container 10 through connection 28, the brine release being controlled by back pressure control valve 30 which maintains operating pressure of liquid in pressure resistant container 10 while releasing brine which is concentrated with respect to the salt or solute originally present in the feed liquid. In the modification of the system illustrated in FIG. 5 the membrane element-carrying assembly 12 is rotated, and the pump 34 is actuated independently by manual and pedal effort as shown.

The manually operated reverse osmosis system of this invention is useful for applications where ordinary power is not available such as for emergency use in lifeboats, for troops in the field, for hunters, prospectors, and campers, and other applications where relatively small quantities of pure water are required. The rotating membrane element module requires only a small amount of power for rotation of the membrane element-carrying assembly. The pump does not have to pressurize and supply a large excess of feed liquid to the module so that turbulence is maintained over the membrane surfaces by pumped liquid flow or circulation. Therefore, the amount of power required for pumping is only the minimum required for pressurization and transfer of the feed liquid. Thus the power for pumping plus that for membrane element rotation can be reduced to such a low level that operation of the system by human effort, by handle or pedal rotation or movement, is completely practical. Additionally, because of the extremely efficient use of power and the purified liquid output for energy expended the unit can be light, readily portable and compact, particularly if the means for rotating the membrane element-carrying assembly and the means for actuating the pump are interconnected. As an example, a compact unit with interconnected drives operated by a double handle was designed to be less than three feet long, to weigh only 30 pounds and to produce potable water from sea water at a rate, after establishing steady state conditions, of about one quart per hour. It could be operated without undue exertion by one man and a few hours effort daily could produce a minimum supply for several men in a lifeboat. When purifying brackish water, which contains less salt than sea water, higher flux membranes may be employed as will be appreciated by those skilled in the art and the effort required per gallon of purified water output will be less than for sea water conversion. Another very important advantage of the reverse osmosis unit of this invention is that it makes available a portable, manually operated unit which will desalt feed water to produce potable water which is generally free of virus and bacteria. Purified water produced even in remote locations where the only available power is human effort will be potable and germ free even though the raw water source may be contaminated.

It is significant that the reverse osmosis system of this invention needs only a minimum of pump capacity and pumping effort. Therefore, a pump which is smaller and more readily available and more easily operated by manual or pedal effort may be employed. The combination of such a small pump with the rotating membrane element assembly produces a complete unit with an operating energy requirement well within the capability of a single individual.

I claim:

1. A reverse osmosis system comprising a pressure resistant vessel containing a semipermeable membrane, a pump for introducing feed liquid under pressure into said vessel, means for releasing concentrated liquid from said vessel, and means for collecting purified liquid passing through said semipermeable membrane, in which the improvement comprises:
   a. a rotatable membrane element carrying-assembly contained in said pressure resistant vessel;
   b. means for rotating said membrane element-carrying assembly; and,
   c. means for actuating said pump;
   d. said means for rotating said membrane element-carrying assembly and said means for actuating said pump being adapted for actuation by human effort and being mechanically interconnected.

2. A reverse osmosis system according to claim 1 in which said means for rotating said membrane element-carrying assembly and said means for actuating said pump comprise a shaft connected to said membrane element-carrying assembly for rotation thereof, and to said pump for actuation thereof, and a lever attached to said shaft for actuation of said shaft by human effort.

3. A reverse osmosis system according to claim 2 in which said lever comprises a handle for actuation of said shaft by human effort.

* * * * *